(No Model.)
E. S. ABBOTT.
LEATHER INDICATOR.
No. 305,036. Patented Sept. 16, 1884.
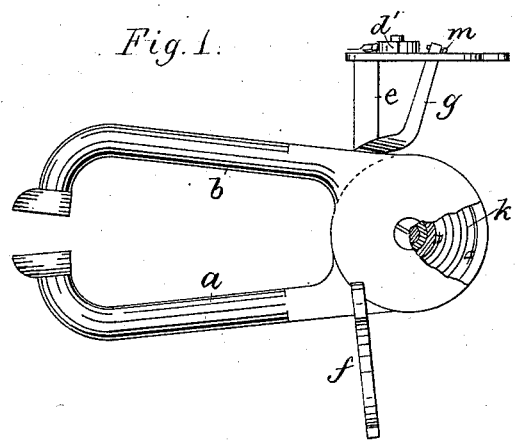
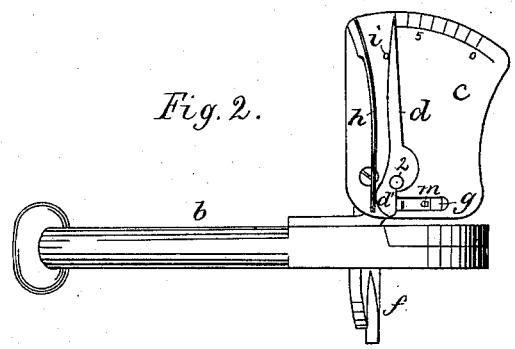
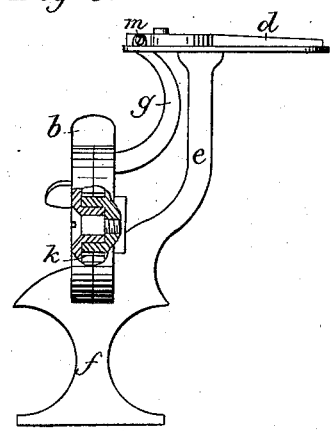
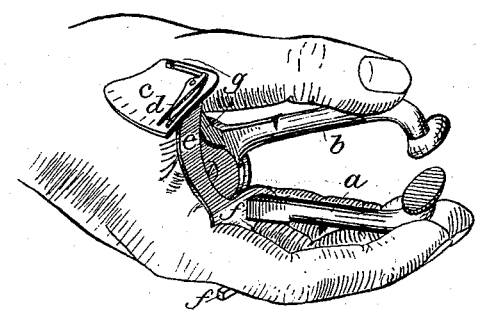
Witnesses,
Henry Marsh
Arthur Tipperton
Inventor,
Essex S. Abbott
by Crosby & Gregory
Attys.

UNITED STATES PATENT OFFICE.

ESSEX S. ABBOTT, OF BOSTON, MASSACHUSETTS.

LEATHER-INDICATOR.

SPECIFICATION forming part of Letters Patent No. 305,036, dated September 16, 1884

Application filed February 23, 1884. (No model.)

*To all whom it may concern:*

Be it known that I, ESSEX S. ABBOTT, of Boston, county of Suffolk, State of Massachusetts, have invented an Improvement in Leather-Indicators, of which the following description, in connection with the accompanying drawings, is a specification, like letters on the drawings representing like parts.

My invention relates to an indicator or gage for testing the thickness of leather, the gage being of suitable construction to be conveniently held in the hand, leaving the fingers, however, free to be used at the same time to feel of the leather or examine it by touch as to softness and texture, the said indicator or gage being applied to the leather from point to point, as may be desired, to indicate its exact thickness at such points, so that the operator may examine a piece of leather in the usual way as to its softness and texture, and without any further expenditure of time may also accurately measure its thickness from point to point. The indicator consists, essentially, of a pair of jaws pivoted together, one of which is provided with a holding device to pass between the fingers of the operator, so that the jaws lie within the hand and along the inner sides of the thumb and fingers, which may be used in the ordinary manner to feel of the leather or examine it from point to point, and whenever desired the jaws may be closed upon the leather to indicate, in connection with a suitable dial and pointer operated by them, the exact thickness of the leather at the point tested, the operation of closing the jaws upon the leather being almost the same as that of closing the thumb and finger of the hand. One of the jaws, which may be called the "stationary" one, has connected with it the dial on which the pointer is pivoted, and the other jaw, which may be called the "movable" one, is provided with a pointer-operating projection or arm, which engages the pointer near its pivot, and thus as the jaws are closed turns the said pointer, the movement of the jaws being magnified at the end of the pointer.

Figure 1 is a side elevation of a leather indicator or gage embodying this invention; Fig. 2, a plan view thereof; Fig. 3, an end elevation, and Fig. 4 a perspective view showing the instrument in the hand of the operator.

The instrument consists, mainly, of two jaws, *a b*, and an indicating-dial, *c*, and pointer *d*, pivoted thereon at 2, the said dial being supported on an arm, *e*, of the main or stationary jaw *a*, which is also provided with a holding device or finger-piece, *f*, adapted to fit between two of the fingers of the hand near their junction with the palm, as shown in Fig. 4, so that the jaws *a b* extend along the inside of the thumb and fingers in position to be closed by the pressure of the said thumb and fingers toward one another. The movable jaw *b* is provided with a pointer-operating finger, *g*, the end of which passes through a slot in the dial-plate *c*, as shown in Fig. 2, and when the jaws are pressed together moves through the said slot and engages with the short arm *d'* of the pointer *d*, thereby moving the said pointer over the graduations of the dial until the jaws are arrested by the material between their ends, when the end of the pointer will indicate on the dial the thickness of the said material. It will be seen that by properly proportioning the length of the finger *g* and that of the long and short arms of the pointer *d*, the movement of the end of the latter over the graduations may be any desired multiple of the movement of the ends of the jaws *a b*, so that the divisions on the scale may be much greater than the actual corresponding distances between the ends of the jaws; or, in other words, the indicator may multiply or increase to any desired amount. The pointer *d* is normally held by a spring, *h*, against a stop, *i*, and the jaws *a b* are supported by a spring, *k*, surrounding their pivotal joint, as shown in Figs. 1 and 3, in which a portion of the jaws around the joint and inclosing the said spring is broken away, showing the joint in section. The end *d'* of the pointer, or of the finger *f*, that comes in contact therewith, will preferably be provided with an adjustable contact-piece, *m*, shown as a screw, which may be moved from time to time as the contacting parts wear, so as to cause the pointer to give correct indications.

In operation the instrument is held inside the hand, as shown in Fig. 4, and the hand is used to feel of the leather or material to be tested in the usual manner, so as to examine its texture and thickness by touch, and whenever a more accurate observation is desired the jaws may be closed upon the material, when the pointer will at once indicate to the eye the exact thickness.

The instrument does not interfere with the usual examination by the touch, but serves as an important auxiliary to such an examination whenever desired to determine the thickness more accurately than can be done by touch or feeling. The ends of the jaws preferably have large bearing-surfaces, so as not to compress or sink into the material being tested.

As herein represented, it is supposed that a variation of one one-hundredth of an inch on the thickness of the substance between the jaws, whether it be leather, paper, or other material, will move the pointer over one space of the dial, the graduations of which are one-tenth of an inch apart.

I claim—

1. As an improved article of manufacture, an indicator composed of a pair of jaws pivoted one to the other, and a pointer actuated by the pivotal movement thereof, one of the said jaws being provided with a holding device or finger-piece, whereby the said indicator may be held in the hand while leaving the fingers free to examine by touch the material being tested, substantially as described.

2. The fixed jaw and finger-piece and dial rigidly connected therewith, combined with the movable jaw and pointer-operating projection thereon, and the pointer actuated thereby, as described, whereby the space or thickness of the material between the jaws is indicated on an increased scale, substantially as described.

In testimony whereof I have signed my name to this specification in the presence of two subscribing witnesses.

ESSEX S. ABBOTT.

Witnesses:
G. W. GREGORY,
W. H. SIGSTON.